Dec. 27, 1966  J. G. KAY  3,294,217
WORKPIECE ELEVATOR
Filed Oct. 30, 1964
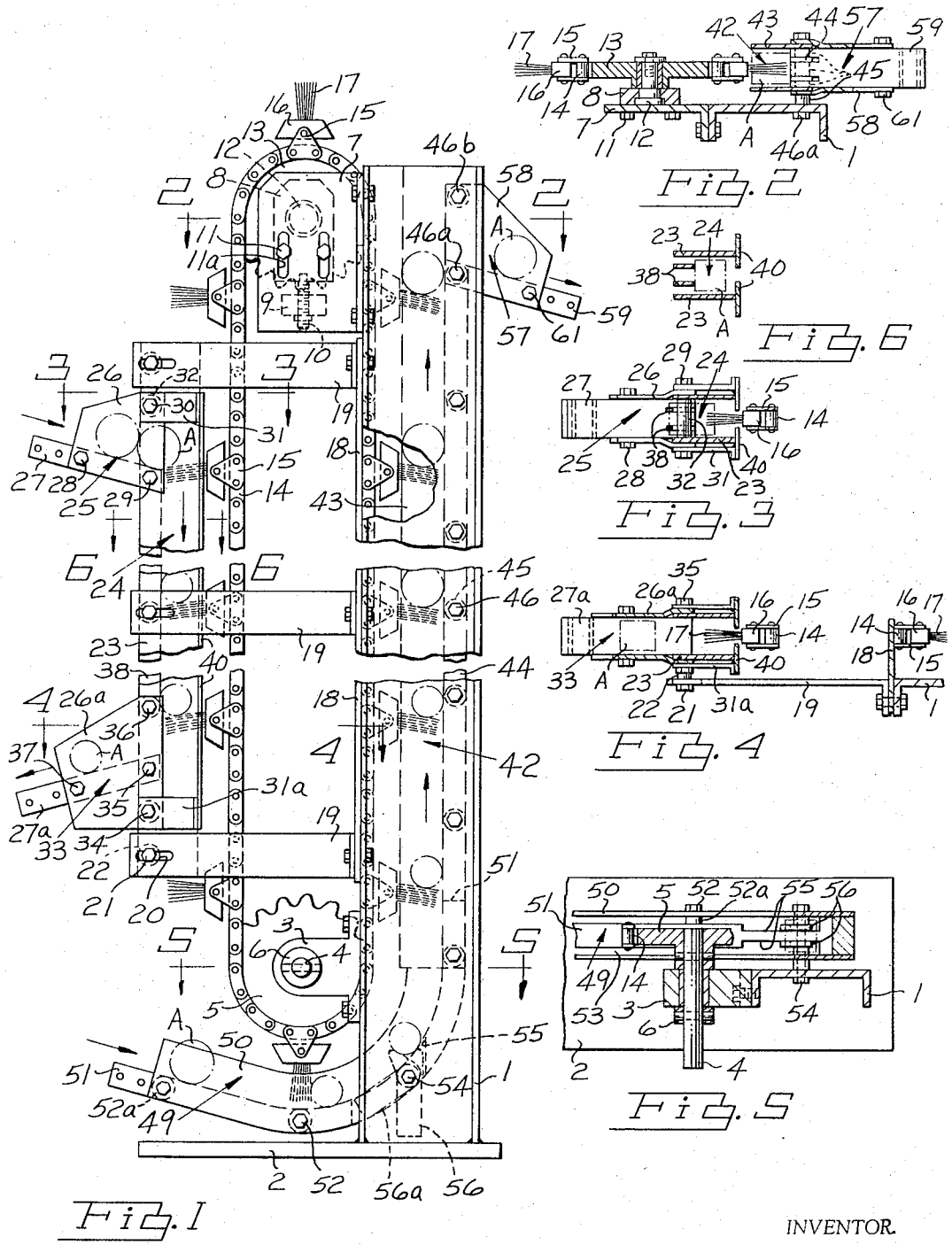
INVENTOR.
JOHN G. KAY
BY
Barnes, Kisselle, Raisch, & Choate
ATTORNEYS

3,294,217
WORKPIECE ELEVATOR
John G. Kay, Detroit, Mich., assignor to F. Jos. Lamb Co., Warren, Mich., a corporation of Michigan
Filed Oct. 30, 1964, Ser. No. 407,701
9 Claims. (Cl. 198—168)

This invention relates to elevators and more particularly to elevators of the type adapted to be used with gravity chuting by means of which workpieces are transferred from one machine to another in an automated machining installation.

In automated machining installations it is common practice to transfer workpieces from one machine to another by gravity chuting. Such machines are rendered more readily accessible if the chuting to and from each machine is sufficiently elevated to provide ample headroom beneath it. Thus it is common practice to employ workpiece elevators adjacent such machines which are adapted to receive workpieces from one machine and elevate them to the upper end of a gravity chute extending to the next machine. Such elevators frequently consist of an endless chain mounted to travel in a vertical plane, the chain having pins or the like mounted thereon which travel in vertical elevator shafts and which support the workpieces being elevated. Usually the drive mechanism for such elevators includes a clutch that is designed to disconnect the drive to the elevator in the event of jamming of workpieces in the elevator. Such elevators also frequently include an escapement mechanism for feeding the workpieces to the elevator one at a time, so as to avoid jamming of the elevator.

It is an object of the present invention to provide a workpiece elevator that does not require the use of a clutch in its drive mechanism and which does not require the use of an escapement mechanism for feeding workpieces to the elevator.

A further object of the invention resides in the provision of a workpiece elevator provided with flexible support members, for example, brushes having resiliently flexible bristles which serve as the workpiece-supporting elements of the elevator.

Another object of the invention resides in the provision of an elevator that is admirably suited for both raising workpieces and for lowering them.

A further object of the invention is to provide an elevator that is constructed so that the workpiece inlet thereof can be substantially at the level of the floor on which the elevator is mounted.

A still further object of the invention is to provide an elevator wherein the workpiece-supporting members consist of flexible elements or brushes having resilient bristles which project through the sides of the elevator shafts adjacent the chain and terminate adjacent the opposite sides of the shafts in which the discharge chutes terminate, so that workpieces rest against said opposite sides during their travel to the level of the discharge chutes and are then eased into the latter by said brushes.

With these and other objects and advantages in view which will become apparent as the specification proceeds, the invention is hereinafter more fully described with the aid of the accompanying drawing, in which:

FIGURE 1 is a side elevational view of an elevator embodying the invention with portions broken away.

FIGURES 2, 3, 4 and 5 are sectional views taken along lines 2—2, 3—3, 4—4 and 5—5, respectively, in FIGURE 1; and FIGURE 6 is a sectional view along line 6—6 in FIGURE 1 showing only the elevator shaft including the guide rails, the retainer rails and the limit plates.

Referring to the drawing, 1 designates a main support consisting in the present instance of a vertical channel which is suitably secured on a baseplate 2. Secured to and extending laterally from the support 1 adjacent its lower extremity is a horizontal bearing 3 which supports a drive shaft 4 for rotation. The axis of the shaft is disposed at right angles to the said support. Mounted on the shaft 4 on one side of the bearing is a sprocket 5 and on the other a collar 6 is secured. Any power drive means (not shown) may be employed for turning the drive shaft directly without utilizing a clutch. Secured to the main support adjacent its upper extremity and extending over the bearing 3 is a vertical guide plate 7 having a stepped bearing 8 mounted on one side thereof for vertical adjustment. Welded or otherwise secured to the side of the guide plate beneath the bearing 8 is a nut 9 through which an adjusting screw 10 is threaded for raising the bearing which is normally secured to the guide plate 7 by screws 11 which extend through vertical slots 11a in the said plate. Supported by the bearing 8 is a stub shaft 12 having a sprocket 13 thereon which is in vertical alignment with the lower sprocket 5, and 14 denotes an endless chain which passes around both sprockets. Secured at uniformly spaced intervals to the chain as by chain attachments 15 and projecting outwardly therefrom are brushes 16 having bristles 17 which are sufficiently resilient to cradle workpieces being raised or lowered upon them, and amply strong enough to support more than one workpiece at a time if desired. Bristles formed of nylon have performed extremely well.

Secured to the side of the main support 1 between the bearing 3 and the guide plate 7 is a vertical reinforcing strip 18 which also forms a back-up plate for the upwardly moving side of the chain 14 intermediately of its length. Projecting horizontally from the strip 18 are a plurality of vertically aligned horizontal straps 19 which extend at right angles to the axis of the sprockets 5 and 13 beyond the downwardly moving side of the chain. Formed through the straps adjacent their outer extremities are horizontal slots 20. Extending outwardly adjacent and in front of the downwardly moving side of the chain intermediately of its height and at right angles thereto are parallel vertical guide rails 23 the inner portions of which define opposite sides of an elevator shaft 24. Bolts 21 extend through the slots 20 in the upper and lower straps, through the guide rails 23 and have spacers indicated at 22 thereon to maintain these parts in spaced relation. Bolt 21 through the intermediate strap also passes through retainer rails 38 hereinafter described.

A delivery chute 25 is provided for delivering workpieces into the elevator shaft 24 adjacent the upper extremity of the latter. In this case chute 25 includes spaced vertical side plates 26 having a downwardly and inwardly inclined runway 27 extending between their lower extremities. The outer portions of the side plates are spaced by the runway 27 the same distance apart as the guide rails 23 between which the runway extends inwardly to the outer side of the elevator shaft 24. Runway 27 may form the lower end of a gravity chute extending to the elevator.

The inner extremities of the side plates 26 are outwardly offset to extend a short distance against the outer faces of the guide rails 23. A bolt 28 extends through both side plates 26 adjacent their outer extremities and through the runway 27. Formed in the runway 27 from its inner extremity are two parallel vertical slots to receive the upper extremities of retainer rails 38. Rails 38 form the outer side of the elevator shaft 24 and extend downwardly between the outer portions of the guide rails to just beneath the upper extremity of the discharge chute 33 hereafter described. Extending through the overlapping extremities of the side plates 26 and the guide rails 23, the runway 27 and the upper extremities of the retainer rails 38 is a bolt 29; and adjacent the upper extremities of the side plates 26 another bolt 30 extends through upper brackets 31, the side plates, the guide rails 23 and a spacer 32 between the latter. It will also be noted that the runway projects outwardly beyond the side plates for attachment to suitable chuting, not shown.

Secured to the guide rails 23 adjacent their lower extremities is the discharge chute 33 which is similar to the delivery chute 25 above described except that its runway 27a is downwardly and outwardly inclined between the lower extremities of the side plates 26a. A bottom bolt 34 extends through lower brackets 31a, laterally offset extremities of the side plates 26s, the guide rails 23 and a suitable spacer between the latter. An intermediate bolt 35 passes through the laterally offset extremities of the side plates 26a, the guide rails 23, and the runway 27a between them; and a top bolt 36 passes through the upper portions of the side plates 26a, the guide rails 23, the lower extremities of the retainer rails 38 and through spacers between the adjacent guide and retainer rails. A bolt 37 also secures the outer extremities of the side plates to runway 27a between them.

Welded or otherwise secured to the extremities of each vertically aligned pair of brackets 31 and 31a adjacent the chain 14 and also the inner edge face of the guide rail adjacent thereto is a limit plate 40. These limit plates are in transverse alignment and sufficiently spaced from one another to permit passage of the bristles 17 of the downwardly moving brushes between them into the elevator shaft. The heads of brushes 16 travel outside the elevator shaft.

Referring now to FIGURES 1, 2 and 5, extending outwardly from and opposite the vertical portion of the chain 14 which travels upwardly is another elevator shaft 42. The opposite sides of the shaft 42 consist of opposed guide rails 43 between and parallel with the outer extremities of which retainer rails 44 are provided. This arrangement is similar to the arrangement of the guide rails 23 and the retainer rails 38 shown in the elevator shaft 24. Vertically spaced bolts 46 each extend through the main support 1, the guide rails 43, the retainer rail 44, and suitable spacers 45 between them. In this case the side of the elevator shaft opposite the chain 14 is open. It will be noted that the bodies of the brushes 16 are relatively long and their opposite ends are inwardly inclined towards the elevator shaft so that if a workpiece should mount upon the upper extremity of a brush it would roll back into the shaft 42, particularly since the chain 14 cannot move materially away from the elevator shaft due to the position of the strip 18 behind it.

The lower extremity of the elevator shaft 42 terminates in horizontal alignment with the axis of the lower sprocket 5, and extending downwardly therefrom and forming a continuation thereof is the inner extremity of a delivery chute 49 which is curved through substantially 90 degrees coaxially with the said sprocket after which it extends somewhat upwardly for attachment to a gravity chute, not shown. Thus as workpieces pass beneath the sprocket 5 in the delivery chute they are engaged by one of the brushes 16 and carried into and up the elevator shaft 42. The delivery chute 49 consists of uniformly spaced side plates 50 having a runway 51 between them. From its receiving end for a portion of its length the runway is narrower than the spacing between the side plates and spacers 52a are provided between the runway and the side plates on bolts 52 which extend transversely through the chute. Thus longitudinal openings 53 are formed inwardly of the side plates through which cuttings and dirt are adapted to drop. Beneath the guide rails 43 the runway becomes the same width as the spacing between the side plates and extends upwardly a short distance between the said guide rails and supports the lower extremities of the retainer rails 44. Extending through the side plates 50 and the runway 51 is a pivot pin 54 which extends across recesses 55 formed longitudinally in opposite sides of the runway. Mounted in the recesses 55 for rotary movement on the pin 54 are stops 56 which, due to their weight distribution, normally hang vertically as shown in FIGURE 1, and project above the runway. Workpieces approaching the elevator shaft 42 turn the stops clockwise, FIGURE 1, to their positions indicated at 56a and travel past them. However the extremities of the recesses in which the stops are mounted prevent the latter turning sufficiently in the opposite direction to permit workpieces to travel downwardly past them.

A discharge chute 57 is mounted on and projects downwardly and outwardly from adjacent the upper extremity of the elevator shaft 42. Chute 57 consists of opposed side plates 58 between which a downwardly and outwardly inclined runway 59 extends. Runway 59 may form the upper end of a gravity chute. The spacing between the outer portions of the side plates 58 is the same as that between the guide rails 43, and the runway 59 also extends between the latter and terminates at its inner extremity flush with the inner margins of the retainer rails 44 the upper extremities of which terminate in slots formed in the said runway. The inner extremities of the side plates are outwardly offset and bear against the outer faces of the adjacent margins of the guide rails. Bolt 46a, in vertical alignment with the bolts 46, extends through the main support 1, a spacer 45, the side plates 58, the guide rails 43, the runway 59 and the upper extremities of the retainer rails 44 which terminate in the latter; another bolt 46b extends through the main support 1, the side plates 58, the guide rails 43, a spacer 45 between the main support and the adjacent side plate and another spacer between the two guide rails; and a third bolt 61 extends through the lower outer extremities of the side plates 58 and the runway 59.

In the above-described elevator construction, it will be appreciated that the use of the brushes 16 with their resilient bristles 17 as the workpiece supporting elements results in several distinct advantages as compared with conventional elevators where the workpiece supporting elements are in the nature of rigid pins secured to the elevator chain. In the first place, the likelihood of workpieces jamming in the elevator is eliminated because in the event the workpieces should become stacked in the elevator for some reason, the brush bristles are adapted to flex and bypass the workpieces. This is particularly true at the delivery chutes 25 and 49. In connection with the delivery chute 49, this is of particular advantage because without the use of an escapement the inlet to the elevator can be located closely adjacent the floor level. In many instances the ability to pick up workpieces from closely adjacent the floor level is of practical necessity in order to avoid sacrificing pitch in the delivery chute to the elevator. It will be appreciated that the lower the level at which the elevator can pick up the workpieces, the greater is the possible pitch of the delivery chute to the elevator. An adquate pitch is very important in gravity chuting, because if the chuting does not have a sufficient pitch the parts will be transferred at too slow a rate, and this is especially true when the parts are covered with a heavy film of oil.

Another important feature of the elevator disclosed herein resides in its ability to serve as a device for lowering workpieces from one elevator to another, as well as raising them without requiring an escapement mechanism. For example, in the case of delivery chute 25, the brushes on the downwardly traveling run of the chain catch the workpieces as they enter the elevator and lower them. If numerous workpieces enter the elevator through chute 25 in rapid succession, there will be no jamming of the elevator because as the load of the workpieces exceeds the carrying capacity of a brush, the brush bristles merely flex downwardly and allow the workpieces to bypass the brush. In this connection, it will be noted that the utilization of brushes as the work-supporting elements of the elevator enables the elevator to accommodate workpieces of various sizes and various shapes. It will also be observed that, since the brush bristles normally flex downwardly under the weight of the workpieces supported thereby, the workpieces tend to gravitate outwardly toward the retainer rails 38. This not only maintains the workpieces in a rolling position at all times, but also facilitates discharge of the workpieces through the discharge chutes without the necessity of providing additional structure at the discharge openings in the elevator to assure discharge of the workpieces therefrom. Although the use of brushes is preferred in many instances, the above mentioned advantages can also be realized when the workpiece-supporting or driving elements are formed of other resiliently flexible members. For example, excellent results have been obtained with the use of urethane driving elements fixed to the elevator chain. Thin pad-like members of dense urethane possess the required resilience and flexibility to drive the workpieces and yet permit by-passing when necessary. Urethane drive members also possess the attributes of good wearing qualities and high resistance to heat and chemical attack.

I claim:

1. A workpiece elevator comprising a pair of vertically spaced sprockets one of which is adapted to be driven, an endless chain trained around the sprockets so that it has an upward traveling run and a downward traveling run, a vertically extending elevator shaft adjacent each of said runs, said elevator shafts being adapted to restrain workpieces therein laterally, each elevator shaft having a slot extending along one side thereof, each slot having a width less than the elevator shaft, a plurality of work pushers on said chain, said pushers extending laterally from said chain and being adapted to project horizontally through said slots and into said elevator shafts to form workpiece-supporting elements and means forming a delivery chute to each elevator shaft and a discharge chute from each elevator shaft the delivery and discharge chutes in each elevator shaft being vertically spaced.

2. An elevator including a main support, parallel horizontal shafts vertically spaced from one another mounted for rotation on said support, a sprocket mounted on each shaft, an endless chain extending around the sprockets whereby one side of the chain moves upwardly as the other side moves downwardly, an elevator shaft secured to the main support spaced in front of each of said sides of the chain whereby the elevator shafts and the said sides of the chain are in transverse alignment, the sides of the elevator shafts adjacent the chain being longitudinally apertured, longitudinally spaced brushes having resilient bristles projecting outwardly from the chain, said bristles being adapted to travel consecutively vertically through the apertured side and the interior of each of said elevator shafts in turn as the chain travels around the sprockets, and a delivery chute and a discharge chute terminating in each elevator shaft, said discharge chutes projecting from the sides of the elevator shafts opposite the apertured sides thereof.

3. The combination in claim 2, wherein the elevator shaft adjacent the upwardly moving side of the chain terminates at its lower extremity in horizontal alignment with the axis of the lower sprocket, and the delivery chute terminating in said elevator shaft forming a downward extension thereof and extending therefrom through 90 degrees coaxially with said lower sprocket.

4. An elevator including a main support, vertically aligned horizontal shafts mounted for rotation thereon, a sprocket on each shaft, an endless chain extending around the sprockets whereby one side of the chain is adapted to travel downwardly as the other side moves upwardly, longitudinally spaced brushes mounted around the chain and projecting outwardly therefrom, parallel vertical guide rails secured to the main support and extending outwardly from adjacent each of said sides of the chain, the guide rails on opposite sides of the chain being in transverse alignment, the inner portions of said guide rails adjacent each side of the chain defining opposite sides of an elevator shaft, said brushes being adapted to project into said elevator shafts and travel consecutively down through one shaft and up through the other, a delivery chute and a discharge chute terminating in each elevator shaft, and retainer rails secured to and between the guide rails to define the sides of the elevator shafts remote from the chain, said retainer rails extending between the chutes terminating in each elevator shaft.

5. The combination in claim 4, wherein each discharge chute extends outwardly from its elevator shaft between the guide rails the inner extremities of which define the opposite sides thereof.

6. The combination in claim 4, wherein the lower extremity of the elevator shaft adjacent the side of the chain adapted to travel upwardly terminates at its lower extremity in horizontal alignment with the axis of the lower sprocket, and the inner extremity of the delivery chute terminating therein forming a downward continuation thereof and extending therefrom coaxially with said lower sprocket through substantially 90 degrees.

7. The combination in claim 4, wherein the brushes include outwardly projecting resilient bristles, opposed vertical limit plates secured to and extending towards one another across the extremities of one opposed pair of guide rails adjacent one side of the chain to define a relatively narrow vertical passage between them through which the bristles of the brushes are adapted to project into the elevator shaft the opposite sides of which are defined by said pair of guide rails.

8. The combination in claim 4, wherein the normally vertical extremities of the bodies of the brushes are inwardly inclined, and a rigid vertical strip secured to the main support extending immediately behind the upwardly moving side of the chain intermediately of its length.

9. An elevator including a main support, vertically aligned horizontal shafts mounted for rotation thereon, a sprocket on each shaft, an endless chain extending around the sprockets whereby one side of the chain is adapted to travel downwardly as the other side moves upwardly, longitudinally spaced brushes mounted on the chain and having resilient bristles projecting outwardly therefrom, parallel vertical guide rails secured to the main support extending outwardly from adjacent each of said chain sides, said guide rails being in transverse alignment, the inner portions of the guide rails adjacent each side of the chain defining opposite sides of an elevator shaft, a delivery chute and a discharge chute terminating in each elevator shaft, the delivery chutes terminating in the elevator shafts nearer the extremities thereof through which said brushes enter than the discharge chutes, vertical retainer rails secured to and between the guide rails and extending between the chutes terminating in each elevator shaft, said retainer rails defining the sides of the elevator shafts remote from the chain, the lower extremity of one elevator shaft terminating in horizontal alignment with the axis of the lower sprocket and one delivery chute forming a downward extension thereof and extending therefrom coaxially with said lower sprocket through substantially 90 degrees, and the other delivery chute and the discharge chutes extending outwardly from their respective elevator shafts between the guide rails defining opposite sides thereof.

References Cited by the Examiner

UNITED STATES PATENTS

| | | | |
|---|---|---|---|
| 561,782 | 6/1896 | Fry | 198—154 |
| 1,432,002 | 10/1922 | Wentz | 198—198 |
| 2,359,522 | 10/1944 | Hesson | 198—168 X |
| 2,924,325 | 2/1960 | Kay | 198—168 |
| 3,071,240 | 1/1963 | Graham | 198—212 |

EVON C. BLUNK, *Primary Examiner.*

EDWARD A. SROKA, *Examiner.*